United States Patent [19]

Thorfinnson

[11] Patent Number: 4,876,153
[45] Date of Patent: Oct. 24, 1989

[54] PROCESS FOR THE PREPARATION OF CYANATE RESIN-BASED PREPREGS AND FILMS WHICH MAINTAIN THEIR TACK

[75] Inventor: Bradley S. Thorfinnson, Orange, Calif.

[73] Assignee: BASF Corporation, Parsippany, N.J.

[21] Appl. No.: 161,753

[22] Filed: Feb. 29, 1988

Related U.S. Application Data

[63] Continuation-in-part of Ser. No. 36,781, Apr. 9, 1987, abandoned.

[51] Int. Cl.$^4$ .......................... B32B 9/04; D04H 1/00; D03D 15/00; C09J 7/02
[52] U.S. Cl. .................................... 428/447; 428/260; 428/272; 428/273; 428/290; 428/352; 428/411.1; 428/286; 428/413; 428/419; 428/473.5; 428/474.4; 428/500; 428/524; 156/289
[58] Field of Search ............... 428/260, 272, 273, 290, 428/352, 413, 419, 447, 473.5, 474.4, 500, 524, 286, 411.1; 156/289; 264/130

[56] References Cited

U.S. PATENT DOCUMENTS 3,749,593 7/1973 Keiser ............................. 156/289 X
4,276,352 6/1981 Green ............................. 428/260 X Primary Examiner—Ellis P. Robinson
Assistant Examiner—Susan S. Rucker
Attorney, Agent, or Firm—William G. Conger

[57] ABSTRACT

Cyanate-functional resin adhesives, matrix resin films and prepregs which maintain their tack for extended periods may be prepared using silicone coated release film containing low levels of residual metal catalyst, or which have had their silicone coating prepared in the absence of such catalysts.

28 Claims, No Drawings

PROCESS FOR THE PREPARATION OF CYANATE RESIN-BASED PREPREGS AND FILMS WHICH MAINTAIN THEIR TACK

This is a continuation-in-part of application Ser. No. 036,781 filed Apr. 9, 1987, now abandoned, which is herein incorporated by reference.

BACKGROUND OF THE INVENTION

1. Field of the Invention

The subject invention relates to the preparation of cyanate resin-based prepregs and films for use in advanced structural materials. More particularly, the subject invention relates to cyanate resin-based prepregs and films which maintain their tack. Such prepregs and films are useful as a component of structural composites and as high performance adhesives in aerospace, transportation, and other industries. 2. Description of the Related Art The use of fiber-reinforced composite materials has increased markedly in recent years. Coupled with the increased use of such materials is the increased use of structural adhesives. Together, these two materials are replacing high-strength magnesium, aluminum, steel, and titanium in many applications while offering considerable savings in weight at the same time. The composites are generally prepared by stacking several layers, or plies, of fiber-reinforced prepregs together and curing under heat and pressure. The composites thus prepared may be adhesively joined to other composites or to metal structures, or may be joined by means of conventional fasteners such as screws, bolts, and rivets. Often, both conventional fasteners and adhesives are used concurrently.

Prepregs and adhesive films may be prepared by a variety of methods. Prepregs may be prepared by impregnating the fiber reinforcing substrate with resin from solution, from the melt, or by application under heat and pressure of one or more resin films. The resin films themselves may be cast from solution or prepared from the melt. Prepregs and films manufactured by these methods are generally prepared in the form of rolls, with a release film on one or both sides. Without such release films, considerable interlayer adhesion would occur, rendering the products either wholly useless, or at least very difficult to use in their intended applications.

The release film may be selected from a variety of materials. Polymeric materials have been used, for example polyalkylenes such as polyethylene and polypropylene, or substituted polyalkylenes such as polyvinyl and polyvinylidene chlorides and fluorides. Highly fluorinated polymers, such as polytetrafluoroethylene have been used when appropriate. Many of these polymer release films must still be coated with a release coating to provide the necessary release properties. Silicone coatings are most commonly used for this purpose.

Paper release films have certain advantages over other materials. In addition to being very economical, the paper release films generally possess greater stiffness than many of the polymeric films, which contributes to their ease of use. However, uncoated papers are usually, if not always, totally deficient in that they adhere too strongly to the film or prepreg, making their later removal difficult. They may also leave a residue of cellulosic fibers on the prepreg or adhesive surface after their removal. Further, in many cases, resin will adhere to the release film upon the latter's removal rendering the adhesive film or prepreg totally useless. Thus, coated release papers have proven to be necessary. The coating enables release during later processing while at the same time providing enough adherence to successfully prepare the film or prepreg. The release coatings which have been found to be most effective and at the same time economically attractive are the various silicone release coatings. Thus both polymeric and paper release films generally require a silicone release coating to be effective.

Resin systems which have been used in the past to prepare prepregs and adhesive films include the various phenolic resins, epoxy resins, polyimide and bismaleimide resins and the like. The use of cyanate-functional resins has recently been introduced for the manufacture of prepregs and adhesives. These cyanate resins have considerably enhanced physical properties over many of the conventional resin systems, including the bismaleimides. At times, however, prepregs and films prepared from cyanate resin systems to which are attached silicone-coated release films would rapidly lose their tack, presenting a tack-free and sometimes powdery surface. Such a tack-free surface causes difficulties in handling the prepregs and films, and in achieving the requisite inter-ply fiber orientation. These difficulties are particularly pronounced during composite assembly. Furthermore, the composites prepared from tack-free prepregs can, in extreme cases, have lower interlaminar shear strength.

SUMMARY OF THE INVENTION

It has now been unexpectedly discovered that cyanate resin prepregs and films which maintain their tack for extended periods may be prepared utilizing silicone coated release papers and films, so long as the amount of residual catalyst used in preparing the silicone release coating remains below a critical level. Alternatively, silicone coated release papers whose coating is cured through the use of electron beams or actinic radiation may be used. This discovery allows the preparation of cyanate resin prepregs and films which retain the cost and performance advantages made possible by the use of silicone coated release papers and films and yet which maintain their tack for extended periods.

DESCRIPTION OF THE PREFERRED EMBODIMENTS

The cyanate resins used in the prepregs and films of the subject invention contain cyanate functional monomers, oligomers, or prepolymers which correspond generally to the formula:

R—[—OCN]$_n$ where n is an integer from 2 to about 5 and where R is an aromatic or substituted aromatic organic residue having a valence n. The cyanate functional monomers may be reacted and/or modified with a variety of other resins, for example maleimides, epoxies, acrylics, silicones, silicon-epoxies, alkyds, polyesters, polyurethanes, phenolics, melamines, and polyimides.

Examples of suitable cyanate functional monomers include dicyanatobenzene, tricyanatobenzene, dicyanatonaphthalene, tricyanatonaphthalene, 2,2'-, 2,4'-, and 4,4'-dicyanatobiphenyls, 2,2'-, 2,4'-, 3,3'-, and 4,4'-dicyanatodiphenylmethanes, 2,2-bis(4-cyanatophenyl)propane, 2,2bis(3,5-dichloro-4-cyanatophenyl)- propane, 2,2-bis(3,5-dibromo-4-cyanatophenyl)propane, bis(4-cyanatophenyl)ether, bis(4-cyanatophenyl)thioether, bis(4-cyanatophenyl)sulfone, tris(4-cyanatophenyl)phosphite, and cyanate-functional oligomers and polymers obtained through the reaction of novolaks with cyanogen halides.

The cyanate functional monomers are prepared by known methods, generally by reacting a di- or polyhydric phenol with cyanogen chloride or cyanogen bromide. Especially preferred di- or polyhydric phenol cyanate precursors are the various bisphenols and their analogues, most particularly bisphenol A.

The cyanate functional monomers may also be converted to cyanate functional prepolymers prior to use in the cyanate resin systems of the subject invention. Polymerization of the monomers to prepolymers may be effectuated with catalysts such as Lewis acids, mineral acids, or salts such as sodium carbonate or lithium chloride. Preferably, the cyanate functional prepolymers have molecular weights of from about 400 to about 6000 Daltons. The cyanate functional prepolymers may be advantageously used in conjunction with the cyanate functional monomers.

Preferably used as comonomers in the cyanate functional resin systems of the subject invention are the various maleimide resins, particularly the bismaleimides. Such comonomers are conveniently prepared by known methods, for example by reacting maleic anhydride with a suitable amine. Suitable maleimides are the maleimides of 2,2'-, 2,4'-, 3,3'- and 4,4'-diaminodiphenyloxides, 2,2'-, 2,4'-, 3,3'- and 4,4'-diaminodiphenylsulfones, 2,2'-, 2,4'-, 3,3'-, and 4,4'-diaminodiphenylmethanes, 1,4-phenylenediamine, xylylenediamine, 1,4-cyclohexanediamine, hexahydro-2,4- and 2,6-toluenediamines, bis(4-aminocyclohexyl)methane and 2,2'-, 2,4'-, and 4,4'-diaminodicyclohexanes. Also well suited as the maleimide comonomer are the polyaminobismaleimides prepared by reacting one of the aforementioned bis-maleimides with a diamine. Suitable diamines include the same diamines utilized to prepare the bis-maleimides as well as the moderate and long chain aliphatic diamines, for example 1,4-butanediamine, 1,6hexanediamine, 1,8octanediamine, 1,10-decanediamine, and 1,12-dodecanediamine.

Epoxy resins may also be utilized as comonomers in the cyanate functional resin systems of the subject invention. These resins are characterized by the presence of two or more oxirane groups in the resin molecule and are well known resins of commerce. Examples of resin mixtures containing cyanate functional monomers and other comonomers such as the maleimides and epoxies are given in U.S. Pat. Nos. 4,110,364, 4,287,014, 4,544,704, and 4,533,727, which are herein incorporated by reference. The exact nature of the cyanate and other components makes little difference, as all will be adversely affected by silicone release coatings containing high residual catalyst levels.

The proportions of the cyanate-functional resin may be varied within wide limits. However, it is not expected that heat-curable resins containing less than about 20 percent by weight of cyanate-functional monomers will be significantly affected by residual metal catalysts in a silicone release coating unless the silicone has a high level of such residual catalysts. Therefore, the term "cyanate-functional resin" both here and in the claims, should be considered as including only those resins which contain greater than about 20 percent by weight of cyanate-ctional monomers.

Typical cyanate-functional resins contain from 30 to about 90 percent by weight of cyanate-functional monomer, preferably from 50 to about 80 percent by weight. These resins may further typically include up to about 20 percent by weight of bismaleimide resin, and up to about 20 percent by weight of epoxy resin. From 0.01 to about 4.0 percent, preferably from 0.01 to about 1.0 percent of a suitable catalyst is generally required. Such catalysts are well known to those skilled in the art. The balance of the composition may include plasticizers, tackifiers, fillers, whiskers, rheology control agents, inhibitors, and other additives as the particular application may require.

For example, a typical formulation may include 72 parts of 2,2-bis[4-cyanatophenyl]-propane, 8 parts of bis[4-(N-maleimido)phenyl]methane, 20 parts of DEN® 431, a novolak based epoxy resin available from the Dow Chemical Company, Midland, Michigan, and 0.05 parts tin (II) octoate.

When the cyanate functional resin systems are utilized to make films for use as adhesives or for use in later preparing prepregs, the resin may be applied to release paper by any known coating method. Generally, the resin is applied to the release paper substrate in the melt, with the film thickness being adjusted by suitable means such as by a doctor blade or nip rolls. Alternatively, the film may be cast from solution by applying a solution of the resin followed by evaporation of the solvent. Solvents such as acetone, methylethylketone, methylene chloride, chloroform, dimethylformamide, N-methylpyrollidone and the like are suitable. The film is often deposited on a very thin woven or non-woven supportive substrate called a scrim. This is particularly true when the film is to be used as an adhesive.

Following the preparation of the film, it may be subjected to a variety of additional processing steps. For example, it may be passed between heated surfaces to partially B-stage the resin, or between rollers to produce an appropriate surface modification such as a calendared surface. Generally, the release film or paper backed resin film is then wound in the form of a roll.

Cyanate resin containing prepregs may be prepared by a variety of methods. The fiber-reinforcement may be in the form of individual fibers, staple fibers, fiber tows, yarn or roving, or may consist of woven fabrics, or woven or non-woven mats. The fibers may be the same or different and may be selected from a wide range of materials. Most commonly, the fibers are glass fibers or carbon/graphite (C/G) fibers. However, other inorganic fibers such as boron, aluminum, boron nitride, silicon, and silicon carbide are sometimes used. Among the organic fibers which may be used are the nylons, polyesters, polyacrylics, polyurethanes, polyimides, polysulfones, and polycarbonates, among others. Particularly preferred among the organic fibers are those with very high tensile strength such as the aromatic polyamide (aramid) fibers. Natural fibers, while not preferred, may also be useful for certain applications. As used herein, the term "fiber reinforcement" includes both the relatively lightweight woven or non-woven scrims designed to support or reinforce adhesive films, and also the generally stronger fiber reinforcement normally found in prepregs.

Various methods of resin impregnation are possible. The most commonly utilized techniques, however, are solution impregnation, melt impregnation, and film impregnation.

In solution impregnation, the fibers to be impregnated are passed through a solution containing the matrix resin dissolved in a suitable inert solvent. The solvent is then evaporated, leaving the relatively nonvolatile resin behind. This process may be repeated several times to achieve the necessary resin content, which is generally from about 15 percent to about 65 percent by weight of the finished prepreg, preferably between 20 and 45 percent by weight, and particularly, between 25 and 40 percent by weight. Solvents which are useful include the same solvents suitable for preparing cast films.

In melt impregnation, neat resin in the melt is applied to the fibers. The resin may be carefully metered onto the fibers, may be applied with the aid of thickness controlling devices such as doctor blades, nip rolls and the like, or by combinations of these and other traditional methods of applying coatings. Following application of the neat resin, the prepreg may be subjected to heat treatment to partially B-stage the resin, and to "working" between pressure rollers or nip rollers to achieve optimum resin distribution or surface modification.

The melt impregnation technique suffers from the drawback that resins with high melting or softening points may spend too much time at elevated temperatures resulting in prepregs which are too far advanced. Furthermore, with viscous resins, uniform impregnation is difficult to achieve without extensive working of the prepregs following resin application.

Film impregnation is a widely used technique to produce prepregs. In film impregnation, the fiber to be impregnated is fed between heated pressure rollers along with one or more previously prepared thin films of matrix resin. The matrix resin films may be applied only to one side of the yarn, tape, fabric, or mat, or may be applied to both sides. The sandwich of fiber and matrix resin film is compressed and heated in order that the matrix resin flow and thoroughly impregnate the fibers. The prepreg may then pass through a number of pressure rollers or nip rollers to work the resin into the fibers.

The advantage of the film impregnation method is that it is subject to tight control of the fiber/resin weight ratio. Furthermore, changes in resin content are easily calculated and provided for. Finally, a wide variety of matrix resins, including those with limited solubility, high melting and softening points, and high viscosity may be used. The use of the resin as a uniform film ensures that the resin content of the prepreg will likewise be uniform.

The release film or paper performs an important function in the preparation of both matrix resin and adhesive films and in the preparation of prepregs. Since all these products contain a tacky, partially cured resin, release films or papers are necessary to prevent adjacent layers of adhesive, matrix resin film, or prepreg from sticking together. At the same time, these release papers or films must "release", i.e. must be easily strippable from the adhesive film, matrix resin film, or prepreg in order that these products may be used for their intended functions.

In film impregnation of prepregs, for example, the release paper is stripped from the advancing film and wound on a take-up spool in order that impregnation take place, while simultaneously one or more new release films are applied to the prepreg before, during or after actual impregnation. When the finished prepregs are assembled into composites, the release paper must again be stripped away.

If the resin film adheres firmly to the release film or paper, the resin film is useless. Not only is its use as an adhesive rendered impossible, but its use in automated film-impregnation of prepregs is precluded also. Thus, the most commonly utilized release papers and films are those prepared by coating a suitable substrate with a silicone release.

The release film or paper substrate is generally a conventional paper formed from wood pulp or other cellulose base. Examples are bleached and unbleached Kraft paper. However, papers produced with unconventional materials, e.g., polyester, polyacrylic, and polyalkylene fibers and homogenous plastic films such as "poly" may be used as the substrate. The term "release film" as used herein includes all of the above types of films, as well as release papers.

The silicone release coatings which are applied to the release papers and films are generally polysiloxanes, most particularly polydimethylsiloxanes. Preparation of such silicones is described in the *Encyclopedia of Polymer Science and Technology*, vol. 12, 1970, by John Wiley & Sons, in the chapter entitled "Silicones", particularly pages 522–531 and 552–557. The use of such silicones as release agents is also discussed in this chapter. Frequently, metal salts, especially metal carboxylate salts, are used as curing agents for these silicones. Among the most frequently used carboxylates are the tin carboxylates such as tin octoate and dibutyltindilaurate. In other processes, precious metal catalysts such as various platinum or rhodium compounds are utilized. Most recently, silicone coatings have been made available which are electron beam cured, or cured with actinic radiation, particularly ultraviolet light.

It has now been discovered that a relationship exists between the level of residual metal catalyst in the silicone release coating and the out-time viscosity and tack of the resin. This discovery has enabled the development of the subject invention wherein silicone coated release papers having appropriate catalyst levels may be used without significantly affecting the out-time of the prepreg. The result is the preparation of release film coated, cyanate functional resin-containing prepregs and films whose resin viscosities are relatively stable with respect to time, and which maintain their tack characteristics for extended periods.

Examples of the metal catalysts which have been discovered to react adversely with cyanate-functional prepregs and films, for example, are the various commonly used catalysts of antimony, zinc, cobalt, copper, lead, manganese, titanium, iron, tin and other heavy metals. As used herein, the term "heavy metal" includes the transition metals of the fourth period of the periodic chart of the elements and the metals of groups IIIA, IVA, and VA, but does not include the so-called platinum family of metals, i.e. the group VIIIB elements of the fifth and sixth periods. These latter are referred to herein as precious metals.

Tin, lead, and zinc compounds are most frequently used in preparing silicone coating materials with tin being particularly preferred. Examples of catalysts commonly used are tin octoate, zinc octoate, dibutyltindilaurate, dibutyltindiacetate, cobalt naphthenate, zinc naphthenate, zinc chloride, tin(IV) chloride, tin oleate, dibutyltinmaleate, manganese naphthenate, lead naphthenate, and lead stearate. Most commonly used are tin octoate, tin naphthenate, and dibutyltindilaurates and acetates.

Platinum and other precious metal catalysts are also frequently used in preparing silicone release coatings. Examples of platinum catalysts which have been used include hexachloroplatinic acid and hexafluoroplatinic acid. One of the advantages to the use of precious metal catalysts is their high catalytic activity, permitting their use at relatively low levels. However, when these silicone coatings are utilized with cyanate functional prepregs, the same high catalytic activity which encourages their use in the preparation of silicones causes undesirable advancement of cyanate resin. Therefore, the precious metal catalyst level is critical to the use of silicone release films in these applications.

In order that the silicone release coating not affect the tack of the cyanate-functional resin containing prepreg or film, the residual metal catalyst level of the silicone coating must be low. Preferably, the metal catalyst level is zero. However, this low level is only possible with papers whose silicone coating is cured through the use of electron beams or actinic radiation. Examples of electron beam cured coatings may be found in U.S. Pat. Nos. 4,435,259 and 4,564,576, while ultraviolet light cured coatings may be found in U.S. Pat. No. 4,684,670 and the references cited therein.

Two methods are available to ascertain whether the residual catalyst level is suitable. Preferably, the catalyst level is measured indirectly by measuring the change in resin viscosity after a one or two week storage period at room temperature. The room temperature storage time is generally referred to in the industry as the "out-time," as distinguished from shelf-life or storage-time which are measured when proper storage, i.e. storage at reduced temperature, is utilized. A release coating which causes an increase in resin viscosity over a one-week period which is less than about 2.5 times the initial resin viscosity contains catalyst levels which are low enough for the practice of the subject invention.

The resin viscosity may be determined by methods known to those skilled in the art. For example, ASTM method D3835-79, "Rheological Properties of Thermoplastics with a Capillary Rheometer" may be utilized provided the resin has an initial viscosity which is low enough such that the measurement may be made at a temperature substantially below the curing temperature of the resin.

Preferably, however, viscosity measurements are made directly on prepregs and films utilizing ASTM method D4440-84, "Rheological Measurement of Polymer Melts Using Dynamic Mechanical Procedures," in conjunction with ASTM D4065-82, "Determining and Reporting Dynamic Mechanical Properties of Plastics." In this method, a parallel plate mechanical spectrometer such as that supplied by Rheometrics Corporation as a "Rheometric Viso-Elastic Tester" is utilized to measure the viscosity of samples measuring 50 mm in size. The viscosity measurements reported herein were made isothermally at 50° C. at a frequency of 10 hz and a strain amplitude of 10. Calibration of the instrument was performed as specified by the manufacturer. As viscosity is a specific material parameter, the measurement of viscosity by means of other instruments or techniques should provide comparable measurements.

Another guide to the suitability of a particular silicone coated release film is the relative metal count of the silicone release as established by x-ray fluorescence spectroscopy. In measuring the relative metal count, a background count is first established. This background count will vary with the type of x-ray fluorescence spectrometer and with the sample size. However, with a given spectrometer and sample size, the metal count of the silicone coated release film should not be more than two times the background count.

For example, using a Siemens SRS 200 Sequential X-ray Spectrometer, Kristalloflex 810 x-ray generator and Nim Bin Measuring Electronic Module, the normal background count for 1¼ inch round samples of silicone free poly and paper release films is about 58 to 61. Silicone coated release films where the silicone coating was prepared using tin catalysts perform excellently when the samples' tin count is approximately the same as the background count. As the metal count increases over the background count, the metal catalyst begins taking its toll on the resin tack until when a metal count twice the background count is reached, the particular silicone coated release film is no longer suitable.

Unfortunately, this method is not particularly suitable when platinum, rhodium or other precious metal catalysts have been utilized to prepare the silicone coatings. Although these catalysts are generally utilized at extremely low concentrations, their effect on prepreg and adhesive film tack is much more pronounced than even residual tin. Therefore, only the most exceptionally low levels may be tolerated. The maximal levels of these silicone catalysts is best established through measuring the change in resin viscosity as indicated previously. Of course, once suitable films are identified, absolute catalyst levels may be established through the use of x-ray fluorescence spectrometry together with the use of an internal standard containing a known level of the same metal.

When silicone release papers meeting the above requirements are utilized, the cyanate-functional resin containing prepregs and films retain their tack for extended periods. However, when silicone release papers not meeting these requirements are utilized, the prepreg resins and films rapidly develop a tack-free, high melt viscosity surface not suitable for use in manufacturing prepregs, composites, or structural adhesives.

To test the effect of silicone release coatings on the cyanate functional resin films, a thin, 5 mil layer of a heat curable matrix resin based on 2,2-bis(4-cyanatophenyl)propane whose monomer content is substantially the same as that disclosed in Example 1 of European patent No. EP 0 230 631 was doctored from the melt onto a variety of release papers. The resin was applied at either 125° F. or 300° F. The resultant films were allowed to cool and were stored for a period of two weeks at room temperature. The release paper was then removed from the film and the film examined for tack. The results are presented in Table I. The amount of residual metal catalyst present in the coating was measured by means of x-ray fluorescence spectroscopy as described previously. Tin counts given are relative values. The background tin count is approximately 61.

TABLE I

| Paper No. | Base | Release Type | Tin Count | Resin Temperature | Tack | Comments |
|---|---|---|---|---|---|---|
| | | | Non-Silicone Coated Papers | | | |
| 1 | Kraft, poly one side | None | 61 (background) | 125 | Good | Difficult release |
| | " | None | 61 (background) | 300 | Good | No release |
| 2 | Semi-bleached Kraft Glassine | Quilon | 73 | 125 | Good | Very tight release |
| | | | Silicone Coated Release Papers of Subject Invention | | | |
| 3 | Semi-bleached Kraft Glassine | Silicone Emulsion | 61 | 300 | Good | Normal release |
| 4 | Polyester | Solvent Silicone | 91 | 300 | Good | Smooth |
| 5 | Parchment | Solvent Silicone | 73 | 125 | Good | Normal |
| 6 | L.D.P.E. | Solvent Silicone | 114 | 125 | Poor | Smooth |
| | | | Comparison Silicone Coated Release Papers | | | |
| 7 | H.D.P.E. | Solvent | 158 | 125 | None | Powdery |
| 8 | Parchment | Solvent Silicone | 130 | 125 | None | — |
| 9 | Machined Kraft Smooth | Solvent Silicone | 128 | 125 | None | — |
| 10 | Parchment | Solvent Silicone | 190 | 300 | None | — |

As Table I indicates, papers without any release coating, or those with Quilon ® type coatings (papers 1 and 2) do not generally provide the release properties desirable although they do maintain good tack levels. Silicone coated release films and papers useful for the practice of the subject invention having tin counts from 61 to 114 (papers 3-6), have desirable release properties and provide prepregs and films which maintain their tack for extended periods. However, as can readily be seen, at tin counts of around 114, the tack is already becoming less than ideal. Silicone release coatings which possess residual metal catalyst levels producing counts of 128 and greater cause rapid loss of tack and are unsuitable for the manufacture of cyanate functional resin films and prepregs. The table shows that silicone coatings containing tin counts up to about double the background count are suitable for the practice of the subject invention. Tests with other cyanate-functional resin formulations produce similar results.

Table II indicates the preferred method of gauging papers having suitable catalyst levels. Films were prepared and stored as before. Subjective evaluations of tack were made at two- and three-week intervals. Resin viscosities were measured shortly after preparation and at one- and two-week intervals. The data indicates that papers containing suitably low catalyst levels are those causing less than about a 2.5-fold increase in resin viscosity after one week of storage at room temperature.

The of the invention in which an exclusive property or privilege is claimed are defined as follows:

1. A multiple layer composition comprising:
    (a) a first layer of heat-curable resin which comprises a cyanate-functional resin;
    (b) at least a second layer which is a silicone coated release film removably adherent to said cyanate-functional resin layer;

wherein said silicone coating contains an amount of residual metal catalyst which is effective to cause no greater than a 2.5-fold increase in said heat-curable resin viscosity after storage of said composition at room temperature for one week.

2. The composition of claim 1 wherein said residual catalyst is selected from the group consisting of heavy metal and precious metal catalysts.

3. The composition of claim 2 wherein said cyanate-functional resin is selected from the group consisting of di- and tricyanatobenzene, di- and tricyanatonaphthalene, 2,2'-, 2,4'-, and 4,4'dicyanatobiphenyl, 2,2'-, 2,4'-, 3,3'-, and 4,4'-dicyanatodiphenylmethane, 2,2-bis(4-cyanatophenyl)propane, bis(4-cyanatophenyl)ether, bis(4-cyanato-phenyl)thioether, bis(4-cyanatophenyl)sulfone, cyanato derivatized novolaks, prepolymers of these monomers, and mixtures thereof.

4. The composition of claim 3 wherein said first layer additionally comprises a heat-curable resin selected from the group consisting of epoxy resins, maleimide-group-containing resins, and mixtures thereof.

5. The composition of claim 4 wherein said first layer additionally comprises an unsaturated monomer.

TABLE II

Selection of Silicone Release Papers Having Suitably Low Catalyst Levels by Resin Viscosity Measurement

| | | | | Tack Evaluation | | Resin Viscosity | | |
|---|---|---|---|---|---|---|---|---|
| Example | Paper | Release | Catalyst | 2 weeks | 3 weeks | Initial | 1 week | 2 weeks |
| 11 | latex saturated parchment | Silicone | Pt | good | good | 839.5 | 1012 | 1959 |
| 12 | " | Silicone | Pt | bad | bad | 740.1 | 2810 | 12,300 |
| 13 | " | Quilon | — | good | good | 752.7 | 1195 | 2028 |
| 14 | " | Silicone | Pt | poor | bad | 757.2 | 2037 | 4000 |
| 15 | " | Silicone | sn (190 count) | bad | bad | 842 | 1978 | 4579 |
| 16 | — | — (neat resin) | — | — | — | 975.8 | 1033 | 1752 |

6. The composition of claim 5 wherein said unsaturated monomer is a multiply unsaturated monomer.

7. The composition of claim 6 wherein said multiply unsaturated monomer is selected from the group consisting of diallylphthalate, diallylbisphenol A, diallylbisphenol F, diallylbisphenol S, dipropenylbisphenol A, dipropenylbisphenol F, dipropenylbisphenol S, and acetylene-group terminated polyimides.

8. The composition of claim 4 wherein said heat curable resin additionally comprises an amino group-containing monomer.

9. The composition of claim B wherein said amino group-containing monomer is selected from the group consisting of 1,4-phenylenediamine, 1,3- and 1,4-xylylenediamine, 2,2'-, 2,4'-, 3,3'-, and 4,4'-diaminodiphenylmethane, 2,2'-, 2,4'-, 3,3'-, and 4,4'-diaminodiphenylsulfone, 2,2'-, 2,4'-, 3,3'-, and 4,4'-diaminodiphenyloxide, and 2,2-bis(4aminophenyl)propane and polymethylene polyphenylene polyamines.

10. The composition of claim 4 wherein said maleimide group-containing resin is selected from the group consisting of the bismaleimides of 1,4-phenylenediamine, 1,3- and 1,4-xylylenediamine, 2,2'-, 2,4'-, 3,3'-, and 4,4'diaminodiphenylmethane, 2,2'-, 2,4'-, 3,3'-, and 4,4'diaminodiphenylsulfone, 2,2'-, 2,4'-, 3,3'-, and 4,4'diaminodiphenyloxide, and 2,2-bis(4-aminophenyl)-propane.

11. The composition of claim 2 wherein said precious metal catalyst is selected from the group consisting of platinum, palladium, rhodium, their compounds, and mixtures thereof.

12. The composition of claim 2 wherein said heavy metal catalyst is selected from the group consisting of compounds of zinc, lead, and tin.

13. The composition of claim 12 wherein said heavy metal catalyst is present in a concentration which causes the relative heavy metal count as determined by x-ray fluorescence spectrometry to be no more than about double the background count.

14. The composition of claim 1 wherein said first layer additionally contains fiber reinforcement selected from the group consisting of carbon/graphite, silicon carbide fiberglass, aramid, polyester, nylon, polybenzimidazole, polyethylene and polypropylene.

15. The composition of claim 14 wherein said fiber reinforcement comprises unidirectional, collimated fibers, yarns, and tows.

16. The composition of claim 14 wherein said fiber reinforcement comprises woven cloth.

17. The composition of claim 14 wherein said fiber reinforcement comprises a non-woven mat.

18. The composition of claim 3 wherein said first layer additionally contains fiber reinforcement selected from the group consisting of carbon/graphite, silicon carbide, fiberglass, aramid, polyester, nylon, polybenzimidazole, polyethylene and polypropylene.

19. The composition of claim 18 wherein said fiber reinforcement comprises unidirectional, collimated fibers, yarns, and tows.

20. The composition of claim 18 wherein said fiber reinforcement comprises woven cloth.

21. The composition of claim 18 wherein said fiber reinforcement comprises a non-woven mat.

22. The composition of claim 4 wherein said first layer additionally contains fiber reinforcement selected from the group consisting of carbon/graphite, silicon carbide fiberglass, aramid, polyester, nylon, polybenzimidazole, polyethylene and polypropylene.

23. The composition of claim 22 wherein said fiber reinforcement comprises unidirectional, colimated fibers, yarns, and tows.

24. The composition of claim 22 wherein said fiber reinforcement comprises woven cloth.

25. The composition of claim 22 wherein said fiber reinforcement comprises a non-woven mat.

26. A multiple layer composition comprising:
   (a) a first layer comprising a heat-curable, cyanate-functional resin:
   (b) at least a second layer which is a silicone coated release film removably adherent to said cyanate-functional resin layer;
wherein said silicone coating is cured by means of an electron beam.

27. A multiple layer composition comprising:
   (a) a first layer comprising a heat-curable, cyanate-functional resin;
   (b) at least a second layer which is a silicone coated release film removably adherent to said cyanate-functional resin layer;
wherein said silicone coating is cured by means of actinic radiation.

28. The composition of claim 27 wherein said actinic radiation is ultraviolet light.

* * * * *

UNITED STATES PATENT AND TRADEMARK OFFICE
CERTIFICATE OF CORRECTION

PATENT NO. : 4,876,153

DATED : October 24, 1989

INVENTOR(S) : BRADLEY SCOTT THORFINNSON

It is certified that error appears in the above-identified patent and that said Letters Patent is hereby corrected as shown below:

Column 9, line 66 should read as follows:
The embodiments of the invention in which an exclusive property Column 11, line 10 should read as follows:
9. The composition of claim 8 wherein said amino Column 11, line 17 should read as follows:
phenyloxide, and 2,2-bis(4-aminophenyl)propane and Column 11, line 23 should read as follows:
4,4'-diaminodiphenylmethane, 2,2'-, 2,4'-, 3,3'-, and Column 11, line 24 should read as follows:
4,4'-diaminodiphenylsulfone, 2,2'-, 2,4'-, 3,3'-, and Column 11, line 25 should read as follows:
4,4'-diaminodiphenyloxide, and 2,2-bis(4-aminophenyl)-

Signed and Sealed this

Eighteenth Day of September, 1990

*Attest:*

HARRY F. MANBECK, JR.

*Attesting Officer*  *Commissioner of Patents and Trademarks*